United States Patent [19]

Mertens et al.

[11] Patent Number: 5,050,909
[45] Date of Patent: Sep. 24, 1991

[54] STACK OF SHEET ASSEMBLIES

[75] Inventors: Timothy A. Mertens, Cottage Grove, Minn.; Donn R. Anderson, Clifton Township, Pierce County, Wis.

[73] Assignee: Minnesota Mining and Manufacturing Company, St. Paul, Minn.

[21] Appl. No.: 531,870

[22] Filed: Jun. 1, 1990

[51] Int. Cl.$^5$ ............................................. B42D 15/00
[52] U.S. Cl. ..................................... 283/81; 283/62; 283/117; 281/16; 281/15.1
[58] Field of Search ................... 281/15.1, 16; 283/62, 283/63, 81, 117

[56] References Cited

U.S. PATENT DOCUMENTS

| | | | |
|---|---|---|---|
| 3,332,829 | 7/1967 | Avery | 283/81 X |
| 3,508,754 | 4/1970 | Shorin | 283/81 X |
| 3,524,782 | 8/1970 | Buske | 156/248 |
| 4,281,762 | 8/1981 | Hattemer | 206/390 |
| 4,416,392 | 11/1983 | Smith | 221/45 |
| 4,583,765 | 4/1986 | Messinger | 283/81 X |
| 4,714,276 | 12/1987 | Greig | 283/63 |
| 4,768,810 | 9/1988 | Mertens | 282/12 |
| 4,789,401 | 12/1988 | Ebinger et al. | 106/122 |
| 4,895,746 | 1/1990 | Mertens | 428/40 |
| 4,955,640 | 9/1990 | Anderson | 283/81 X |

FOREIGN PATENT DOCUMENTS

452479  5/1968  Switzerland .

Primary Examiner—Paul A. Bell
Attorney, Agent, or Firm—Gary L. Griswold; Walter N. Kirn; William L. Huebsch

[57] ABSTRACT

A stack of sheet assemblies, each of which sheet assemblies comprises first and second sheets each having front and rear major surfaces and first and second opposite edges, a first layer of adhesive adhering a portion of the rear surface of the first sheet adjacent the first edge of the first sheet to the front surface of the second sheet adjacent the first edge of the second sheet with the first edges generally aligned, the first layer of adhesive extending a first predetermined distance from the first edges toward the second edges of the sheets, and a second layer of pressure sensitive adhesive on the rear surface of the second sheet. The second layer of pressure sensitive adhesive comprises a first portion adhering the rear surface of the second sheet of the sheet assembly to the front surface of the first sheet on the sheet assembly beneath it in the stack within the first distance from the first edge.

12 Claims, 6 Drawing Sheets

STACK OF SHEET ASSEMBLIES

TECHNICAL FIELD

The present invention relates to stacks of sheet assemblies, each of which sheet assemblies comprises at least two sheets adhered together along at least one edge, the stacks being so constructed that individual sheet assemblies may be removed from the stack.

DISCLOSURE OF INVENTION

The present invention provides a stack of sheet assemblies that are easily removed from the stack and applied to a substrate, and require no liner or use of sheets of different sizes in the stack to afford such removal.

According to the present invention there is provided a stack of sheet assemblies, each of which sheet assemblies comprises first and second sheets each having front and rear major surfaces and first and second opposite edges, a first layer of adhesive adhering a portion of the rear surface of the first sheet adjacent the first edge of the first sheet to the front surface of the second sheet adjacent the first edge of the second sheet with the first edges generally aligned, the first layer of adhesive extending a first predetermined distance from the first edges toward the second edges of the sheets, and a second layer of pressure sensitive adhesive on the rear surface of the second sheet. The second layer of pressure sensitive adhesive comprises a first portion adhering the rear surface of the second sheet of the sheet assembly to the front surface of the first sheet on the sheet assembly beneath it in the stack within the first distance from the first edge. The sheet assemblies also include release means for providing first adhesion zones between the front surfaces of the first sheets and the rear surfaces of the second sheets of the sheet assemblies in the stack, the first adhesion zones extending about the first predetermined distance from the first edges toward the second edges of the sheets and providing a release force between the first portions of the second layers of adhesive and the front surfaces of the adjacent first sheets in the stack which is lower than the release force of the first layers of adhesive to the first and second sheets to afford easy initiation of peeling of the uppermost sheet assembly from the adjacent sheet assembly in the stack along the first adhesion zone by pulling on the first sheet of the uppermost sheet assembly on the stack.

In a first embodiment of the stack of sheet assemblies the edqes of the second layers of pressure sensitive adhesive adjacent the second ed9es o( the sheets are spaced toward the first edges of the sheets from the edges of the first layers of pressure sensitive adhesive adjacent the second edges of the sheets so that movement of the second edge of the first sheet of the uppermost sheet assembly in the stack away from the second edge of the second sheet of that uppermost sheet assembly will initiate peeling of its second layer of pressure sensitive adhesive away from the adjacent sheet assembly in the stack.

In a second embodiment of the stack of sheet assemblies the second layers of pressure sensitive adhesive adhering the rear surfaces of the second sheets of the sheet assemblies to the front surfaces of the first sheets on the sheet assemblies beneath them in the stack include second portions positioned between the first adhesion zones and the second edges of the second sheets, and the release means provides second adhesion zones between the front surfaces of the first sheets and the rear surfaces of the second sheets in the stack adjacent the second portions with the second adhesion zones having release forces higher than the low release forces in the first adhesion zones that are sufficiently high to firmly adhere adjacent sheet assemblies in the stack together while affording continued peeling away of the uppermost sheet assembly in the stack along its second adhesion zone after initiating of such peeling along its first adhesion zone.

This second embodiment of the stack of sheet assemblies can be easily dispensed from a container comprising walls around the stack of sheet assemblies, including a bottom wall supporting the stack of sheet assemblies, side walls along and closely spaced from the edges of the sheets in the stack of sheet assemblies including a first end wal) along the first edges of the sheets in the stack of sheet assemblies, and a top wall along the top of the stack of sheets, the top wall having an edge surface spaced from the first end wall to provide an opening. therebetween. The edge surface of the top wall is spaced from the end wall by a distance greater than the first predetermined distance so that with an end portion of the first sheet adjacent its second edge of the uppermost sheet assembly in the staok projecting through the opening, tensIon applied manually to lhat end portIon wIII first cause separation of the second sheet of the uppermost sheet assembly in the stack from the second sheet assembly in the stack along the first adhesion zone by bendirig that second sheet around the edge surface, whereafter the second sheet of the uppermost sheet assembly in the stack will be pulled along the inner surface of the top wall of the container and around the edge surface while arching and carrying with it the first sheet of the second sheet assembly in the stack until an end portion of the second sheet of the uppermost sheet assembly carries an end portion of the first sheet of the second sheet assembly through the opening and is subsequently peeled therefrom, leaving the first sheet of that second sheet assembly (now the uppermost sheet assembly in the stack) projecting through the opening in a position to also be manually pulled therethrough in the manner just described for the uppermost sheet assembly in the stack.

In yet a third embodiment of the stack of sheet assemblies the sheet assemblies each include a third layer of adhesive adhering a portion of the rear surface of the first sheet adjacent the second edge of the first sheet to the front surface of the rear sheet adjacent the second edge of the second sheet with the second edges generally aligned, the third layer of adhesive extending a distance about equal to the first predetermined distance from the second edges toward the first edges of the sheets, and the first sheets are transversely perforated along both adjacent edges of the first and third layers of adhesive.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
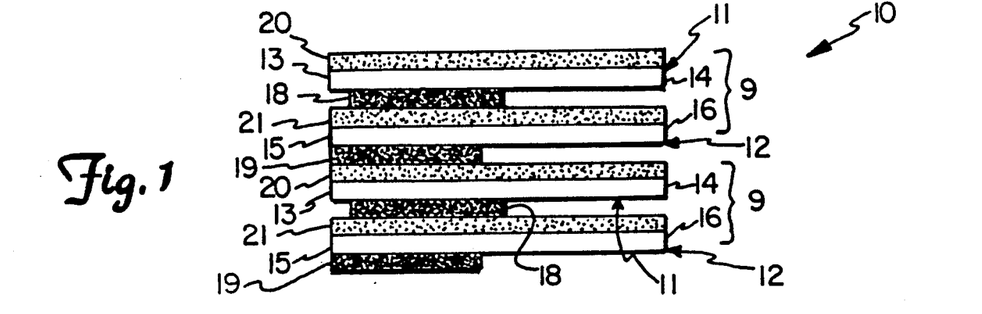
FIG. 1 is a much enlarged side view of·a first embodiment of a stack of sheet assemblies according to the present invention.
Figure 2:
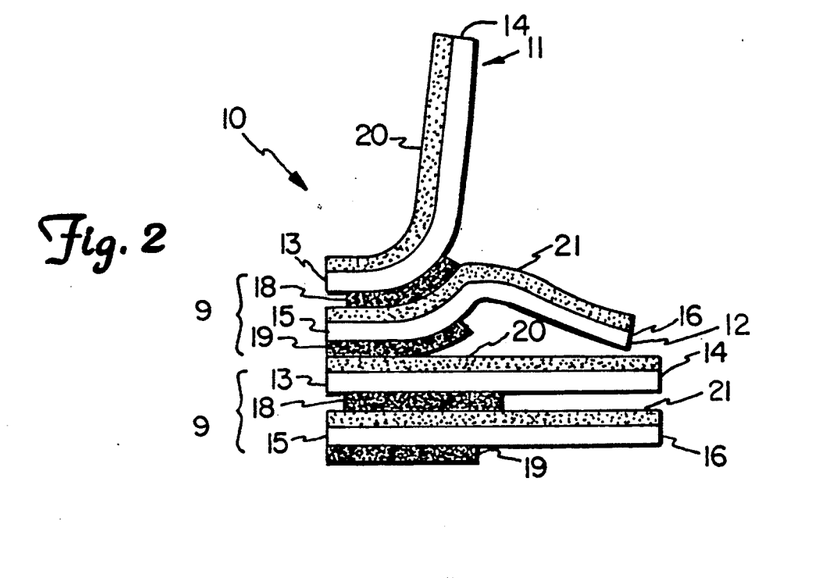
FIG. 2 illustrates initiating separation between the two sheet assemblies in the stack of sheet assemblies illustrated in FIG. 1.
Figure 3:
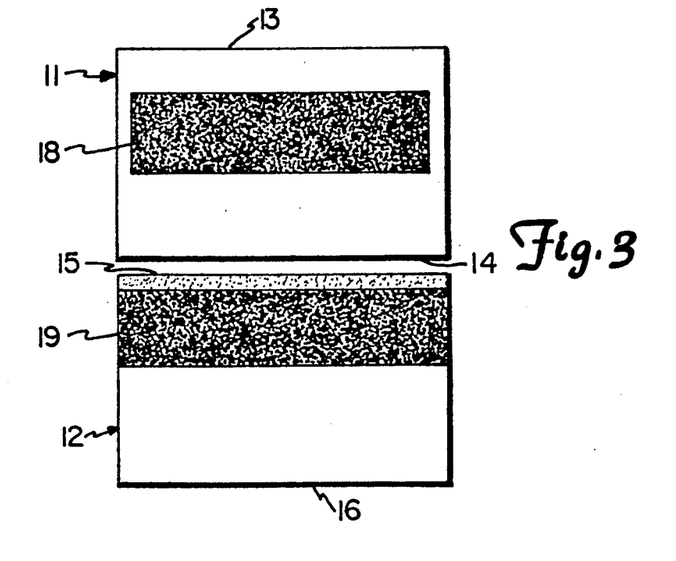
FIG. 3 illustrates the two sheets of one of the sheet assemblies in the stack of sheet assemblies illustrated in FIG. 1, which sheets are shown separated from each other to show the patterns of adhesives on the sheets.

Referring now to FIGS. 1, 2, and 3 of the drawing, there is shown a first embodiment of a stack of sheet assemblies according to the present invention, which stack is generally designated by the reference numeral 10.

The stack 10 includes a multiplicity of sheet assemblies 9, only 2 of which are shown in FIGS. 1 and 2. Each sheet assembly 9 comprises first and second sheets 11 and 12 having the same peripheral shape and size, with each sheet 11 and 12 having front and rear major surfaces and having first and second opposite edges 13, 14 and 15, 16 respectively. In each sheet assembly 9 a first layer 18 of adhesive permanently adheres a portion of the rear surface of the first sheet 11 adjacent its first edge 13 to the front surface of the second sheet 12 adjacent its first edge 15 with the first edges 13 and 15 generally a]igned. The first layer 18 of adhesive extends a first predetermined distance (e.g., less than half the distance) from the first edges 13, 15 toward the second edges 14, 16 of the sheets 11 and 12. A second layer 19 of pressure sensitive adhesive on the rear surface of the second sheet 15 of each sheet assembly 9 comprises (and in this embodiment consists only of) a first portion adhering the rear surface of the second sheet 12 of each sheet assembly 9 to the front surface of the first sheet 11 on the sheet assembly 9 beneath it in the stack 10 within the first distance from the first edges 13 and 15. The sheet assemblies 9 also include release means in the form of coatings of low-adhesion backsize 20 on the front surfaces of the first sheets 11 for providing first adhesion zones between the front surfaces of the first sheets 11 and the rear surfaces of the second sheets 12 of the sheet assemblies 9 in the stack 10, the first adhesion zones extending about the first predetermined distance from the first edges 13 and 15 toward the second edges 14 and 16 of the sheets 11 and 12 and providing a release force between the second layers 19 of pressure sensitive adhesive and the front surfaces of the adjacent first sheets 11 in the stack 10 which is lower than the release force of the first layers 18 of adhesive to the first and second sheets 11 and 12 to afford easy initiation of peeling of the uppermost sheet assembly 9 from the adjacent sheet assembly 9 in the stack along the first adhesion zone by pulling on the first sheet 11 of the uppermost sheet assembly 9 on the stack 10. As can be seen in FIG. 3, the first layers 18 of adhesive that adhere the first sheets 11 to the second sheets 12 are in the shape of a rectangle spaced from the peripheral edges of the sheets 11 and 12 and nearer the center of the sheets 11 and 12 than are the second layers 19 of adhesive which are in the shape of stripe completely across the sheets 11 and 12 adjacent their first edges 13 and 15. The edges of the second layers 19 of pressure sensitive adhesive adjacent the second edges 14 and 16 of the sheets 11 and 12 are spaced toward the first edges 13 and 15 of the sheets 11 and 12 from the edges of the first layers 18 of pressure sensitive adhesive adjacent the second edges 14 and 16 of the sheets 11 and 12 so that pullin9 the second edge 14 of the first sheet 11 away from the second ed9e 16 of the second sheet 12 in the uppermost sheet assembly 9 in the stack as is illustrated in FIG. 2 will initiate peeling of the second layer 19 of pressure sensitive adhesive away from the adjacent sheet assembly 9 in the stack 10 as the top sheet assembly 9 is being removed from the stack 10. Similarly, though not shown, similar removal of a sheet assembly 9 will occur when the second sheet 12 is uppermost in the stack 10, and the second sheet 12 is pulled away from the first sheet 11 in a direction parallel to the longitudinal edges of the sheets 11 and 12. The sheet assemblies 9 can be used for various purposes including carbonless paper notes, form sets, or labels with a receipt portion provided by the first sheet 11, and can have indicia printed on their front surfaces. Such indicia could, for example, include bar codes, or sequential alpha numeric characters. Also, the second sheets 12 preferably have a layer 21 of a release coating alon9 their front surfaces which affords release from the layer 18 of adhesive so that the first sheet 11 can be separated from the second sheet 12 after the sheet assembly 9 is separate from the stack 10 and adhered to a substrate by the layer 19 of pressure sensitive adhesive.

Figure 4:
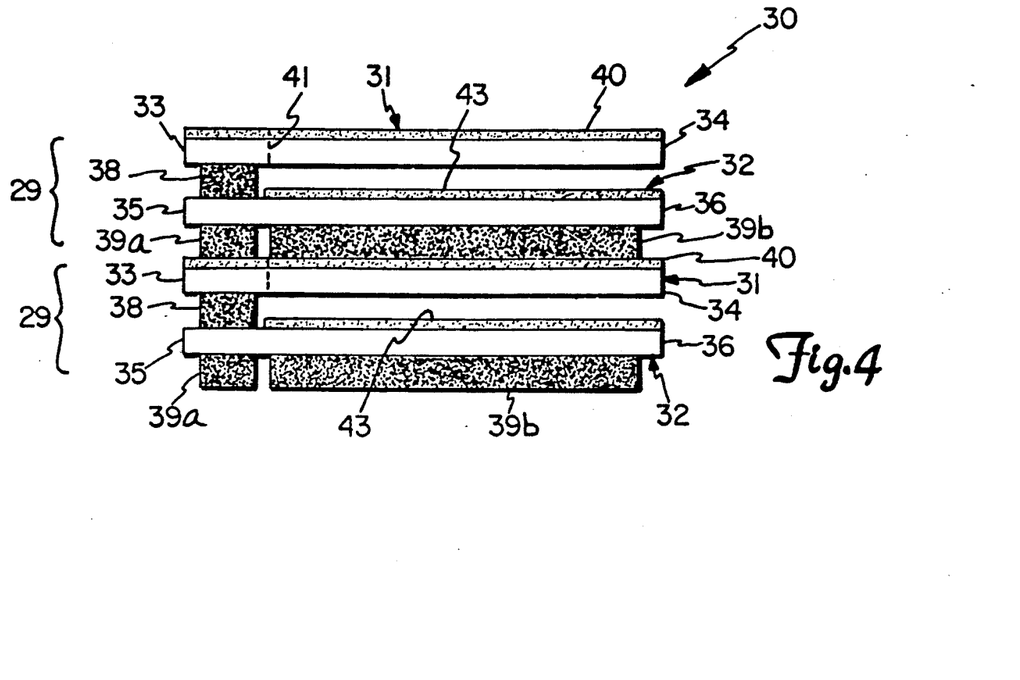
FIG. 4 is a much enlarged side view of a second embodiment of a stack of sheet assemblies according to the present invention.
Figure 5:
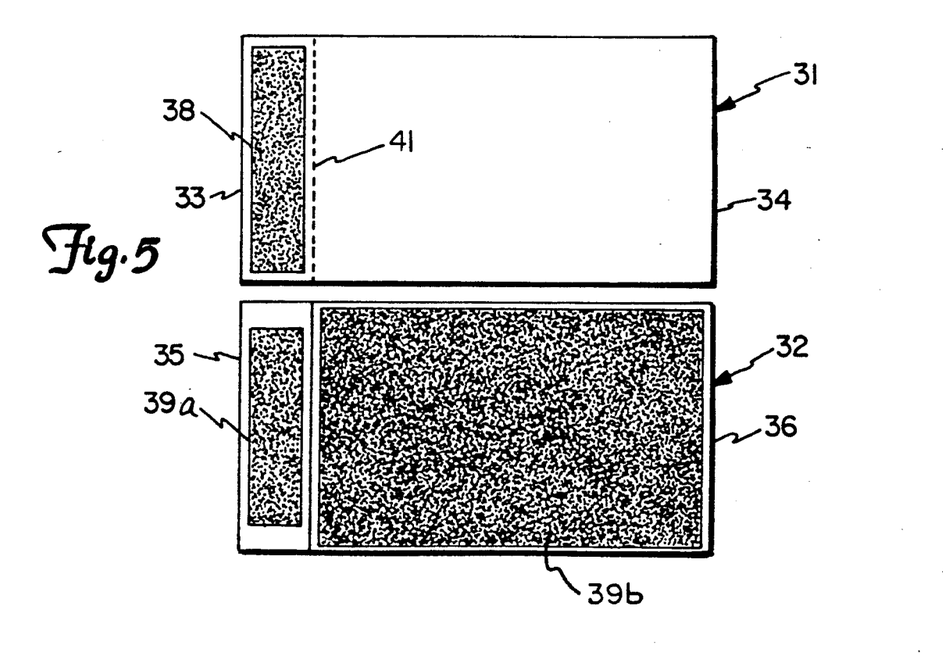
FIG. 5 illustrates the two sheets of one of the sheet assemblies in the stack of sheet assemblies illustrated in FIG. 4, which sheets are shown separated from each other to show the patterns of adhesives on the sheets.
Figure 6:
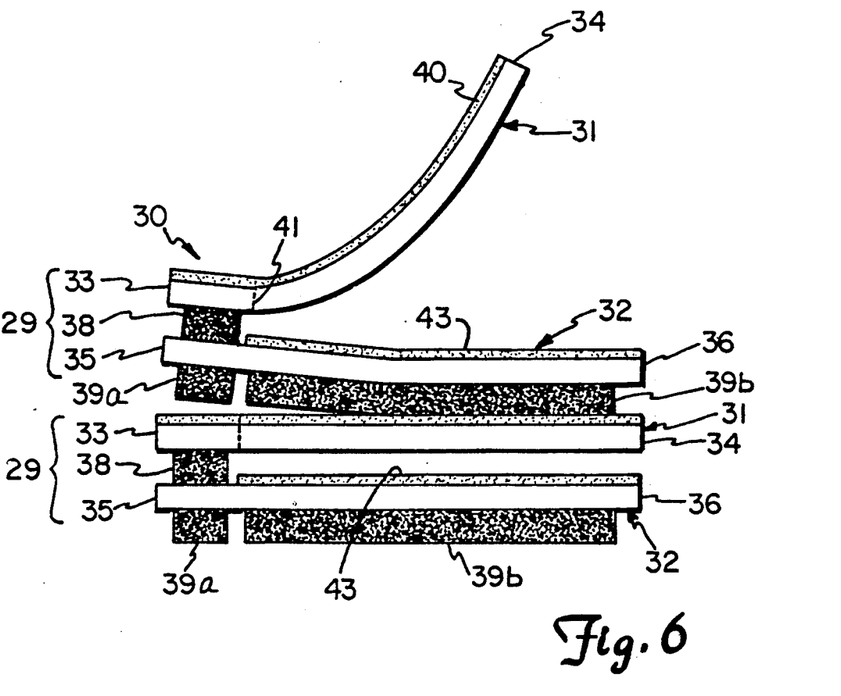
FIG. 6 illustrates initiating separation between the two sheet assemblies in the stack of sheet assemblies illustrated in FIG. 4.

Referring now to FIGS. 4, 5 and 6 of the drawing, there is shown a second embodiment of a stack of sheet assemblies according to the present invention, which stack of sheet assemblies is generally designated by the reference numeral 30.

The stack 30 of sheet assemblies includes a multiplicity of sheet assemblies 29, only 2 of which are shown in FIGS. 4 and 6. Each sheet assembly 29 comprises first and second rectangular sheets 31 and 32 having the same peripheral shape and size, with each sheet 31 and 32 having front and rear major surfaces and having first and second opposite edges 33, 34 and 35, 36 respectively. In each sheet assembly 29 a first layer 38 of adhesive permanently adheres a portion of the rear surface of the first sheet 31 adjacent its first edge 33 to the front surface of the second sheet 32 adjacent its first edge 35 with the first edges 33 and 35 generally aligned. The first layer 38 of adhesive extends a first predetermined distance (e.g., less than half the distance) from the first edges 33, 35 toward the second edges 34, 36 of the sheets 31 and 32. The first sheets 31 have a transverse line of perforations 41 along the edges of the first layers of adhesive 38 adjacent the second edges 34 of the first sheets 31 so that the portions of the first sheets 31 between the perforations 41 and their second edges 34 are manually removable. A second layer 39 of pressure sensitive adhesive on the rear surface of the second sheet 32 of each sheet assembly 29 comprises a first portion 39a within the first distance from the first edges 33 and 35, and a second portion 39b positioned between the first adhesion zone and the second edge 36 of the second sheet 32. The portions 39a and 39b of the second layer 39 of pressure sensitive adhesive adhere the rear surface of the second sheet 32 of the sheet assembly 29 to the front surface of the first sheet 31 on the sheet assembly 29 beneath it in the stack 30. The sheet assemblies 29 also include release means in the form of coatings of low-adhesion backsize 40 on the front surfaces of the first sheets 31 and the use of less aggressive pressure sensitive adhesive in the portions 39a than in the portions 39b of the second layers of pressure sensitive adhesive 39 for providing (1) first adhesion zones between the front surfaces of the first sheets 31 and the rear surfaces of the second sheets 32 of the sheet assemblies 29 in the stack 30 which extend about the first predetermined distance from the first edges 33 and 35 toward the second edges 34 and 36 of the sheets 31 and 32 and providing a release force between the first portions 39a of second layers 39 of pressure sensitive adhesive and the front surfaces of the adjacent first sheets 31 in the stack 30 which is lower than the release force of the first layers 38 of adhesive to the first and second sheets 31 and 32 to afford easy initiation of peeling of the uppermost sheet assembly 29 from the adjacent sheet assembly 29 in the stack along the first adhesion zone by pulling on the first sheet 31 of the uppermost sheet assembly 29 on the stack 30 as is seen in FIG. 6; and for providing (2) a second adhesion zone between the front surfaces of the first sheets 31 and the rear surfaces of the second sheets 32 in the stack adjacent the second portion 39b with the second adhesion zone having a release force higher than the low release force in the first adhesion zone that is sufficiently high to firmly adhere adjacent sheet assemblies 29 in the stack together while affording continued peeling away of the uppermost sheet assembly 29 in the stack 30 along the second adhesion zone after initiating of such peeling along the first adhesion zone. As can be seen in FIG. 5, the first layers 38 of adhesive that adhere the first sheets 31 to the second sheets 32 are in the shape of a rectangle spaced slightly on three sides from the peripheral edges of the sheets 31 and 32, and the first portions 39a of the second layers 39 of pressure sensitive adhesive are also in the shape of a rectangle having elongate sides aligned in the stack 30 with the elongate sides of the first layers 38 of adhesive, but having opposite ends that are spaced further from the peripheral edges of the sheets 31 and 32 than are opposite ends of the first layers 38 of adhesive. Pulling the second edge 34 of the first sheet 31 away from the second edge 36 of the second sheet 32 in the uppermost sheet assembly 29 in the stack as is illustrated in FIG. 6 will fairly easily separate the bond between the first portion 39a of the second layer of pressure sensitive adhesive 39, and will thereby initiate peeling of the more aggressive second portion 39b of the second layer 39 of pressure sensitive adhesive away from the adjacent sheet assembly 29 in the stack 30 as the top sheet assembly 29 is being removed from the stack 30. The sheet assemblies 29 can be used for various purposes including carbonless paper notes, form sets, or labels with a receipt portion provided by the first sheet 31, and can have indicia printed on their front surfaces. Also, the second sheets 32 preferably have a layer 43 of release coating along a portion of their front surfaces which enhance the graphic character of any previously printed indicia.

Figure 7:
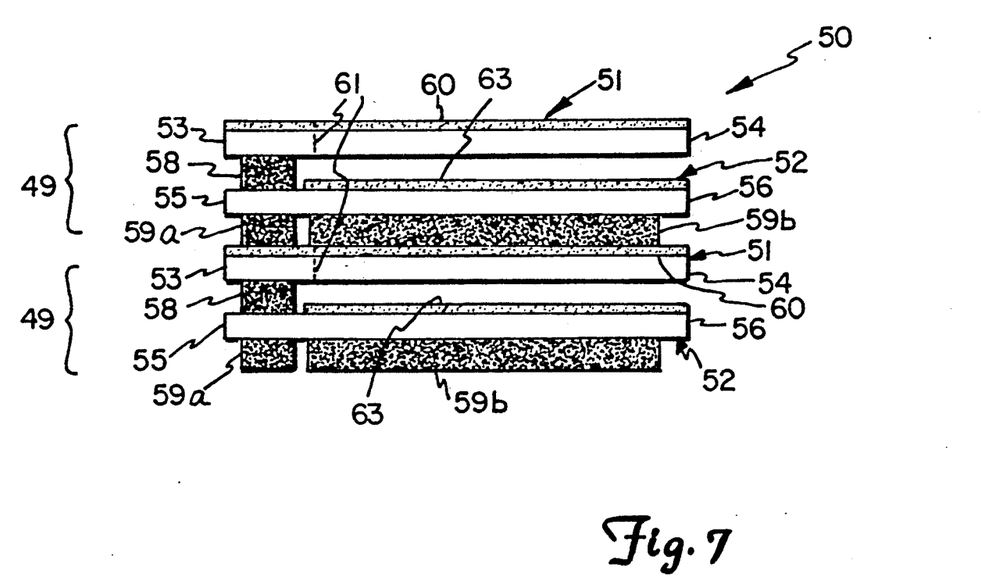
FIG. 7 is a much enlarged side view of a third embodiment of a stack of sheet assemblies according to the present invention.
Figure 8:
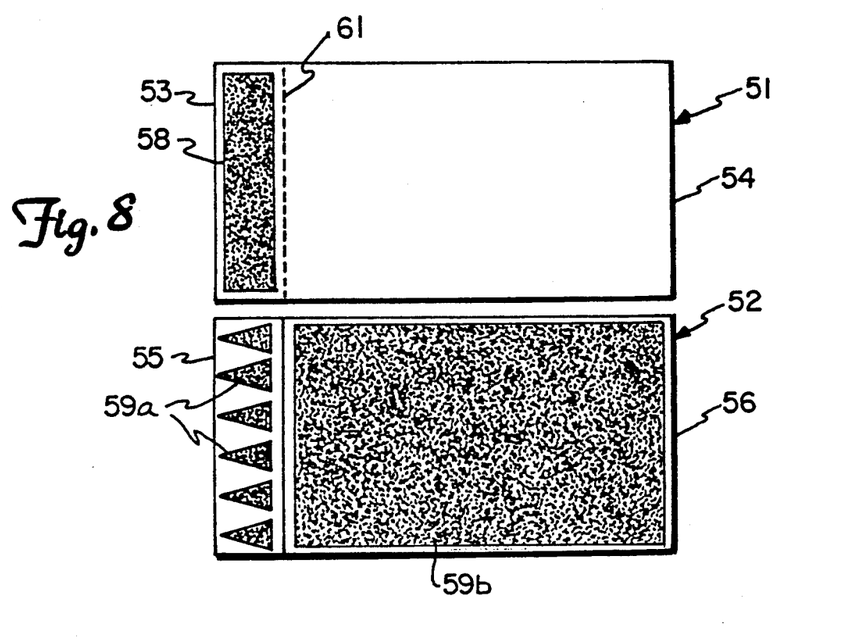
FIG. 8 illustrates the two sheets of one of the sheet assemblies in the stack of sheet assemblies illustrated in FIG. 7, which sheets are shown separated from each other to show the patterns of adhesives on the sheets.

Referring now to FIGS. 7 and 8 of the drawing, there is shown a third embodiment of a stack of sheet assemblies according to the present invention, which stack of sheet assemblies is generally designated by the reference numeral 50.

The stack 50 of sheet assemblies includes a multiplicity of sheet assemblies 49, only 2 of which are shown in FIG. 7. Each sheet assembly 49 comprises first and second rectangular sheets 51 and 52 having the same peripheral shape and size, with each sheet 51 and 52 having front and rear major surfaces and having first and second opposite edges 53, 54 and 55, 56 respectively. In each sheet assembly 49 a first layer 58 of adhesive permanently adheres a portion of the rear surface of the first sheet 51 adjacent its first edge 53 to the front surface of the second sheet 52 adjacent its first edge 55 with the first edges 53 and 55 generally aligned. The first layer 58 of adhesive extends a first predetermined distance (e.g., less than half the distance) from the first edges 53, 55 toward the second edges 54, 56 of the sheets 51 and 52. The first sheets 51 have a transverse line of perforations 61 along the edges of the first layers of adhesive 58 adjacent the second edges 54 of the first sheets 51 so that the portions of the first sheets 51 between the perforations 61 and their second edges 54 are manually removable. A second layer 59 of pressure sensitive adhesive on the rear surface of the second sheet 55 of each sheet assembly 49 comprises a first portion 59a within the first distance from the first edges 53 and 55, and a second portion 59b positioned between the first adhesion zone and the second edge 56 of the second sheet 52. The portions 59a and 59b of the second layer 59 of pressure sensitive adhesive adhere the rear surface of the second sheet 52 of the sheet assembly 49 to the front surface of the first sheet 51 on the sheet assembly 49 beneath it in the stack 50. The sheet assemblies 49 also include release means in the form of coatings of low-adhesion backsize 60 on the front surfaces of the first sheets 51 and the use of discontinuous portions 59a consisting of triangular shaped parts with apexes adjacent the first edges 53 and 54 of the sheets and continuous portions 59b of the second layers of pressure sensitive adhesive 59 for providing (1) first adhesion zones between the front surfaces of the first sheets 51 and the rear surfaces of the second sheets 52 of the sheet assemblies 49 in the stack 50 which extend about the first predetermined distance from the first edges 53 and 55 toward the second edges 54 and 56 of the sheets 51 and 52 and providing a release force between the first portions 59a of second layers 59 of pressure sensitive adhesive and the front surfaces of the adjacent first sheets 51 in the stack 50 which is lower than the release force of the first layers 58 of adhesive to the first and second sheets 51 and 52 to afford easy initiation of peeling of the uppermost sheet assembly 49 from the adjacent sheet assembly 49 in the stack along the first adhesion zone by pulling on the first sheet 51 of the uppermost sheet assembly 49 on the stack 50 as is seen in FIG. 6; and for providing (2) a second adhesion zone between the front surfaces of the first sheets 51 and the rear surfaces of the second sheets 52 in the stack adjacent the second portion 59b with the second adhesion zone having a release force higher than the low release force in the first adhesion zone that is sufficiently high to firmly adhere adjacent sheet assemblies 49 in the stack together while affording continued peeling away of the uppermost sheet assembly 49 in the stack 50 along the second adhesion zone after initiating of such peeling along the first adhesion zone. As can be seen in FIG. 5, the first layers 58 of adhesive that adhere the first sheets 51 to the second sheets 52 are in the shape of rectangles spaced slightly on three sides from the peripheral edges of the sheets 51 and 52. Pulling the second edge 54 of the first sheet 51 away from the second edge 56 of the second sheet 52 in the uppermost sheet assembly 49 in the stack will fairly easily separate the bond between the first portion 59a of the second layer of pressure sensitive adhesive 59, and will thereby initiate peeling of the more aggressive second portion 59b of the seoond layer 59 of pressure sensitive adhesive away from the adjacent sheet assembly 49 in the stack 50 as the top sheet assembly 49 is being removed from the stack 50. The sheet assemblies 49 can be used for the same purposes as the sheet assemblies 29, and can have indicia printed on their front surfaces. Also, the second sheets 52 preferably have a layer 63 of release coating along a portion of their front surfaces which enhance the graphic character of any previously printed indicia.

Figure 9:
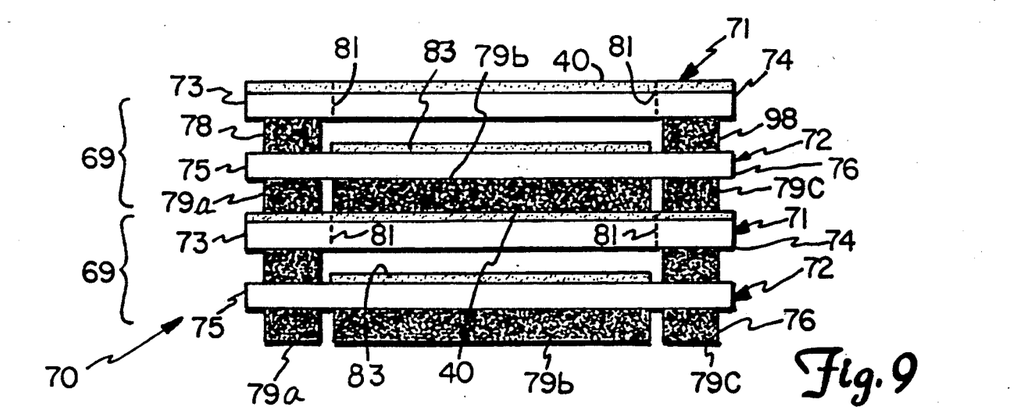
FIG. 9 is a much enlarged side view of a forth embodiment of a stack of sheet assemblies accordin9 to the present invention.
Figure 10:
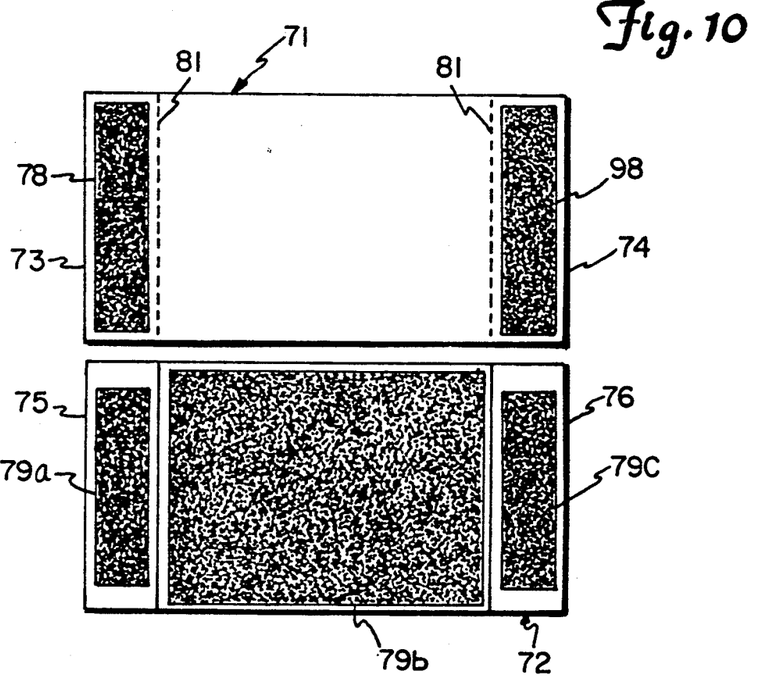
FIG. 10 illustrates the two sheets of one of the sheet assemblies in the stack of sheet assemblies illustrated in FIG. 9, which sheets are shown separated from each other to show the patterns of adhesives on the sheets.

Referring now to FIGS. 9 and 10 of the drawing, there is shown a fourth embodiment of a stack of sheet assemblies according to the present invention, which stack of sheet assemblies is generally designated by the reference numeral 70.

The stack 70 of sheet assemblies includes a multiplicity of sheet assemblies 69, only 2 of which are shown in FIG. 9. Each sheet assembly 69 comprises first and second rectangular sheets 71 and 72 having the same peripheral shape and size, with each sheet 71 and 72 having front and rear major surfaces and having first and second opposite edges 73, 74 and 75, 76 respectively. In each sheet assembly 69 a first layer 78 of adhesive permanently adheres a portion of the rear surface of the first sheet 71 adjacent its first edge 73 to the front surface of the second sheet 72 adjacent its first edge 75 with the first edges 73 and 75 generally aligned, and a third layer 98 of adhesive permanently adheres a portion of the rear surface of the first sheet 71 adjacent its second edge 74 to the front surface of the second sheet 72 adjacent its second edge 76 with the first and second edges 73, 75 and 74, 76 generally aligned. The first and third layers 78 and 98 of adhesive extend a first predetermined distance (e.g., less than one third the distance) from the edges 73, 74, 75 and 76 which they are adjacent toward the opposite edges edges 73, 74, 75, and 76 of the sheets 71 and 72. The first sheets 71 have spaced transverse lines of perforations 81 along the adjacent edges of the first and third layers 78 and 98 of adhesive 78 so that the portions of the first sheets 71 between the perforations 41 are manually removable. A second layer 79 of pressure sensitive adhesive on the rear surface of the second sheet 72 of each sheet assembly 69 comprises a first portion 79a within the first distance from the first edges 73 and 75, a third portion 79c within the first distance from the second edges 74 and 76, and a second central portion 79b positioned between the first and third portions 79a and 79c. The portions 79a, 79b and 79c of the second layer 79 of pressure sensitive adhesive adhere the rear surface of the second sheet 72 of the sheet assembly 69 to the front surface of the first sheet 71 on the sheet assembly 69 beneath it in the stack 70. The sheet assemblies 69 also include release means in the form of coatings of low-adhesion backsize 40 on the front surfaces of the first sheets 71 and the use of less of the same adhesive or less aggressive pressure sensitive adhesive in the portions 79a and 79c than in the portions 79b of the second layers of pressure sensitive adhesive 79 for providing (1) first adhesion zones between the front surfaces of the first sheets 71 and the rear surfaces of the second sheets 72 of the sheet assemblies 69 in the stack 70 which extend about the first predetermined distance from the edges 73, 74, 75 and 76 of the sheets 71 and 72 and provide a release force between the first and third portions 79a and 79c of the second layers 79 of pressure sensitive adhesive and the front surfaces of the adjacent first sheets 71 in the stack 70 which is lower than the release force of the first layers 78 of adhesive to the first and second sheets 71 and 72 to afford easy initiation of peeling of the uppermost sheet assembly 69 from the adjacent sheet assembly 69 in the stack along the first and third adhesion zone by pulling on the first sheet 71 of the uppermost sheet assembly 69 on the stack 70; and for providing (2) a second central adhesion zone between the front surfaces of the first sheets 71 and the rear surfaces of the second sheets 72 in the stack adjacent the second portion 79b with the second adhesion zone having a release force higher than the low release force in the first and third adhesion zones that is sufficiently high to firmly adhere adjacent sheet assemblies 69 in the stack together while affording continued peeling away of the uppermost sheet assembly 69 in the stack 70 along the second adhesion zone after initiating of such peeling along the first adhesion zones. As can be seen in FIG. 9, the first and third layers 78 and 98 of adhesive that adhere the first sheets 71 to the second sheets 72 are in the shape of a rectangles spaced slightly on three sides from the peripheral edges of the sheets 71 and 72, and the first and third portions 79a and 79c of the second layers 79 of pressure sensitive adhesive are also in the shape of rectangles having elongate sides aligned in the stack 70 with the elongate sides of the first and third layers 78 and 98 of adhesive, respectively, but having opposite ends that are spaced further from the peripheral edges of the sheets 71 and 72 than are opposite ends of the first and third layers 78 and 98 of adhesive. Pulling either of the edges 73, 75 or 74, 76 of the first or second sheets 71 or 72 away from the second sheet assembly 69 in the stack 70 will fairly easily separate the bond between the first or third portions 79a or 79c of the second layer of pressure sensitive adhesive 79, and will thereby initiate peeling of the more aggressive second portion 79b of the second layer 79 of pressure sensitive adhesive away from the adjacent sheet assembly 69 in the stack 70 as the top sheet assembly 69 is being removed from the stack 70. The sheet assemblies 69 can be used for various purposes including carbonless paper notes, form sets, or labels with a receipt portion provided by the first sheet 71, and can have indicia printed on their front surfaces. Also, the second sheets 72 preferably have a layer 83 of release coating along a portion of their front surfaces which enhance the graphic character of any previously printed indicia.

Figure 11:
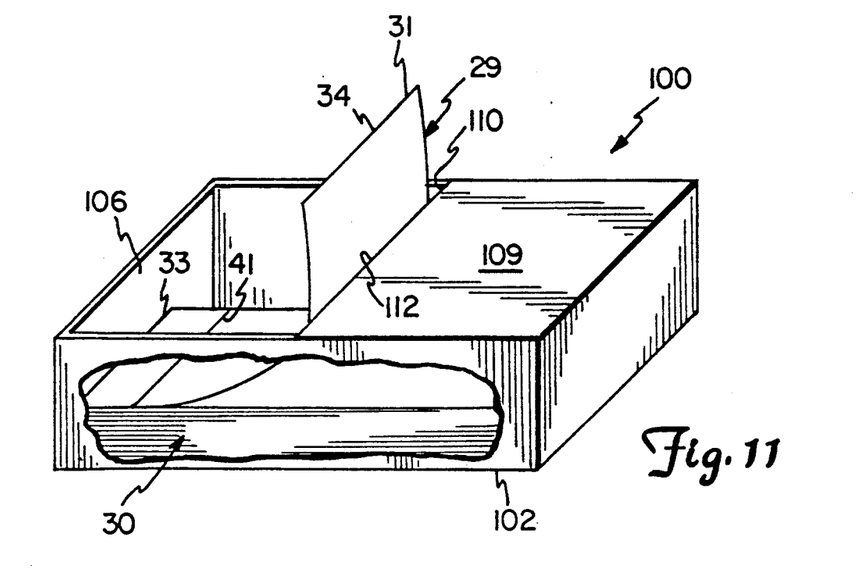
FIG. 11 illustrates a container from which the sheet assemblies from the second and third embodiments of the stack of sheet assemblies may be dispensed, which container has a part broken away to show details.
Figures 12, 13:
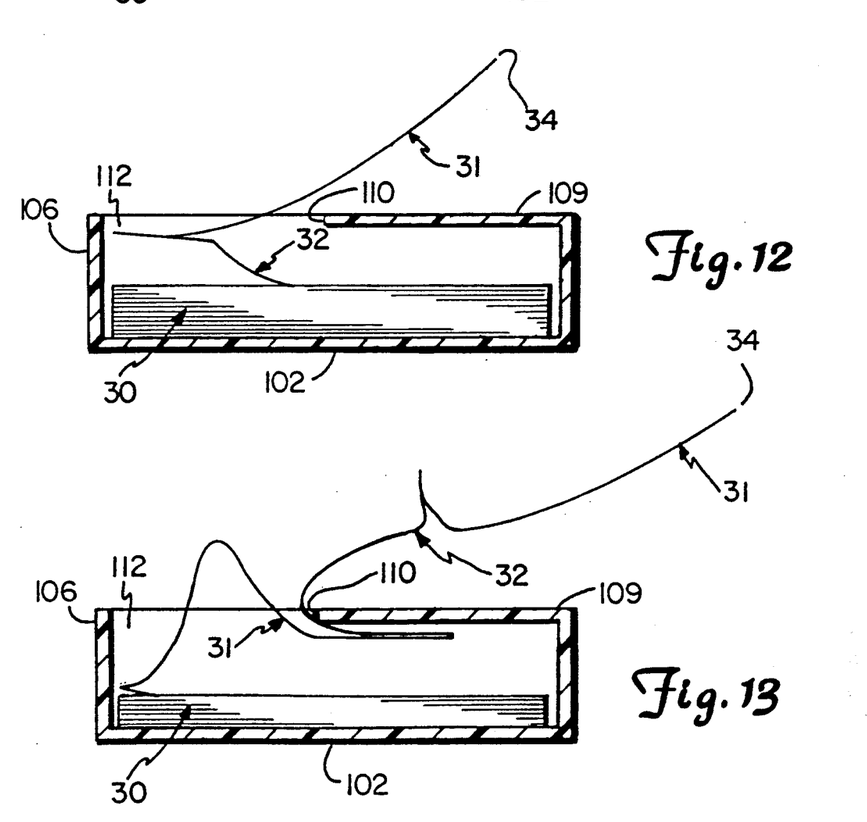
FIGS. 12 and 13 illustrate sequential positions of sheet assemblies during dispensing of sheet assemblies from the container of FIG. 11.

FIGS. 11 through 13 illustrate a container 100 from which sheet assemblies 29 or 49 from the stacks 30 or 50 of sheet assemblies can be dispensed, which container is illustrated in combination with the stack 30 of sheet assemblies 29 illustrated in FIGS. 4, 5 and 6. The container 100 comprises walls around the stack of sheet assemblies, including a bottom wall 102 supporting the stack 30 of sheet assemblies 29, side walls along and closely spaced from the edges of the sheets 31 and 32 in the stack of sheet assemblies 29 including a first end wall 106 along the first edges 33 and 35 of the sheets 31 and 32 in the stack 30 of sheet assemblies 29, and a top wall 109 along the top of the stack 30 of sheet assemblies 29. The top wall 109 has an edge surface 110 spaced from the first end wall 106 to provide an opening 112 therebetween, which edge surface 110 is spaced from the end wall 106 by a distance greater than said first predetermined distance that the layer 38 of adhesive extends so that with an end portion of the first sheet 31 adjacent its second edge 34 of the uppermost sheet assembly 29 in the stack 29 projecting through the opening 112, tension applied manually to that end portion will first cause separation of first portion 39a of the second layer of pressure sensitive adhesive 39 on the second sheet 32 of the uppermost sheet assembly 29 in the stack 30 from the second sheet assembly 29 in the stack 29 along the first adhesion zone by bending that second sheet 32 around the edge surface 110 (FIG. 12), whereafter the second sheet 32 of the uppermost sheet assembly 29 in the stack 30 will be pulled along the inner surface of the top wall 109 and around the edge surface 110 while carrying with it the first sheet 31 of the second sheet assembly 29 in the stack 30 (FIG. 12) until the end portion of the seoond sheet 32 of the uppermost sheet assembly 29 in the stack 30 carries the first sheet 31 of the second sheet assembly 29 in the stack 30 through the opening 112 and is subsequently peeled therefrom, leaving the first sheet 31 of what was originally the second sheet assembly 29 in the stack 30 projecting through the opening 112 in a position to also be manually pulled therethrough in the manner described above.

The present invention will be further described with reference to the followin9 non limiting examples.

EXAMPLE NO. 1

A stack of sheet assemblies of the embodiment illustrated in FIGS. 1, 2, and 3 were produced by first preparing a plurality of the first and second sheets 11 and 12, then laminating them together to form the sheet assemblies 9, and then stacking the sheet assemblies 9. The first sheet 11 was prepared by apsheeting an 12.7 mm strip of a 0.13 mm thick tackified acrylic transfer tape (available from 3M as Scotch TM brand #969 Adhesive Transfer Tape) 3.2 mm from the 118 mm edge on the face without a release coating of the liner Daubert 4020 (commercially available from Daubert Coated Products Company) forming an 118 mm wide and 81 mm long sheet. The second sheet 12 was prepared on a separate paper of the same size. The paper was printed and coated with the silicone release system of 96 parts Syl-Off R 7610 and 4 parts Syl-Off R 7611 (commercially available from Dow Corning Corporation) and cured. To the opposite side was coated an 12.7 mm strip of 0.03 mm thick adhesive Duro-tak R 34-4142 (commercially available from National Starch and Chemical Corporation) 4.8 mm from the 118 mm wide edge. The sheet assemblies 9 were found to be easily separated from the stack 10 by merely grasping the first sheet 11 of the uppermost sheet assembly 9 and lifting. As described previously, when the first sheet 11 of the uppermost sheet assembly 9 was at the top of the stack 10, the uppermost sheet assembly 9 was dispensed while peeling parallel to the 81 mm edge of the stack 10. when the stack 10 was inverted so that second sheet 12 was uppermost, the then uppermost sheet assembly 9 sheet was dispensed while peeling parallel to the 118 mm edge. In either event, when the adhesive coating 18 on the removed sheet assembly 9 was adhered to a substrate, the first sheet 11 could be easily removed from the second sheet 12 and adhered to another substrate by the first layer of adhesive 18.

EXAMPLE NO. 2

A stack of labels generally of the form shown in FIGS. 9 and 10 were produced by printing paper and then coating it with the silicone release system of 96 parts Syl-Off R 7610 and 4 parts Syl-Off R 7611 and curing the release material. To the opposite side of the top sheet were coated 12.7 mm strips of 0.03 mm thick adhesive Duro-tak R 34-4142. The adhesive bars on the top sheet were approximately 9.5 mm wide and 67.0 mm long on the 82.5 mm long and 127.0 mm wide sheet. The bottom sheet was printed and coated with the same release material, as the pictured sheet 22. The same adhesive was used to provide bars 9.5 mm wide and 65.0 mm long. The central block of adhesive, 66 mm long and 87 mm wide was also applied in the center of the sheet. The sheets were laminated, stacked and trimmed. The sheets easily dispensed and were applied to various surfaces. The top sheet was permanently bonded to the bottom using the top sheet's adhesive. The sheets bonded to surfaces, and the central section of the top sheet was easily detached along the lines of weakness formed by a perforation.

EXAMPLE NO. 3

A stack of label or sheet assemblies of the embodiment illustrated in FIGS. 4, 5, and 6 were produced using the paper, release material, and adhesive described in Example No. 2. The first sheet 31 was prepared as above, except only a single layer or bar 38 of adhesive was applied, and only a single corresponding line of weakness was provided by perforations 41. The second sheet 32 was prepared as in Example 2 above, except only a single bar or layer portion 39a of adhesive was provided, and the second portion 39b of the layer 39 of pressure sensitive adhesive was extended to be 98 mm wide. The sheets were laminated to form the sheet assemblies 29, stacked and trimmed. The sheets assemblies 29 easily dispensed from the stack 30 and were applied to various surfaces. The first sheet 31 was permanently bonded to the second sheet 32 by the layer 38 of adhesive. After a dispensed sheet assembly was adhered to a surface by the layer of pressure sensitive adhesive 39, the portion of the first sheet 31 between the perforations 41 and its edge 34 was easily detached along the perforations 41.

EXAMPLE NO. 4

A stack of label or sheet assemblies 49 generally of the embodiment shown in FIGS. 7 and 8 were produced as in Example No. 3, except that the pattern of the first portion 59a of the layer 39 of pressure sensitive adhesive was changed. That pattern was made as series of six isosceles triangles with an 8 mm base and 12 mm sides, spaced 4 mm between bases. The sheet assemblies 50 easily dispensed and were applied to various surfaces. The first sheet 51 was permanently bonded to the second sheet 52 by the layer 58 of adhesive. The first sheet 51 was permanently bonded to the second sheet 52 by the layer 58 of adhesive. After a dispensed sheet assembly was adhered to a surface by the layer of pressure sensitive adhesive 59, the portion of the first sheet 51 between the perforations 61 and its edge 54 was easily detached along the perforations 61. The second sheet 52 was more securely attached at its edge 55 than was the second sheet 32 of Example 3 along its edge 35.

EXAMPLE NO. 5

A container or dispenser for label or sheet assemblies generally of the embodiment shown in FIG. 11 was made for a stack 50 of label or sheet assemblies 49 of the embodiment described in Example No. 4. The dispenser or container 100 was formed from a 0.51 mm card stock material. The stack 50 was 117 mm long and 77 mm wide, the side walls of the dispenser 100 were 22 mm high, the base or bottom wall 102 was 86 mm wide and 122 mm long, and the top wall 109 was 86 mm wide and 92 mm long, leaving an exit orifice or opening 112 82 mm wide and 33 mm long. The layer of pressure sensitive adhesive 59 on the second sheet 52 adjacent the bottom wall 102 was adhered thereto, and the first sheet 51 of the sheet assembly 49 adjacent the top wall 109 was positioned so that it projected through the opening 112. Sheet assemblies 49 were easily dispensed from the dispenser 100 and used in the manner described above The dispenser 100 could be used in horizontal, vertical, or other attitudes.

The present invention has now been described with reference to several embodiments and examples thereof. It will be apparent to those skilled in the art that many changes can be made in the embodiments and examples described without departing from the scope of the present invention. For example, each sheet assembly could contain more than two sheets adhered together in the manners that the first sheets are adhered to the second sheets in the above embodiments. Thus the scope of the present invention should not be limited to the structures described in this application, but only by structures described by the language of the claims and the equivalents of those structures.

We claim:

1. A stack of sheet assemblies, each sheet assembly comprising
   first and second sheets each having front and rear major surfaces and first and second opposite edges,
   a first layer of adhesive adhering a portion of the rear surface of said first sheet adjacent the first edge of the first sheet to the front surface of said second sheet adjacent the first edge of the second sheet with said first edges generally aligned, said first layer of adhesive extending a first predetermined distance from said first edges toward the second edges of said sheets, and
   a second layer of pressure sensitive adhesive on said rear surface of said second sheet, said second layer of pressure sensitive adhesive comprising a first portion adhering the rear surface of the second sheet of the sheet assembly to the front surface of the first sheet on the sheet assembly beneath it in the stack within said first distance from said first edge,
   said sheet assemblies including release means for providing first adhesion zones between the front surfaces of the first sheets and the rear surfaces of the second sheets of the sheet assembli in the stack said first adhesion zone extending about said first predetermined distance from the first edges toward the secon edges of said sheets and providing a release force between said first portions of said second layers of adhesive and the front surfaces of the adjacent first sheets in the stack which is lower than the release force of the first layers of adhesive to said first and second sheets to afford easy initiation of peeling of the uppermost sheet assembly from the adjacent sheet assembly in the stack along the first adhesion zone by pulling on the first sheet of the uppermost sheet assembly on the stack.

2. A stack of sheet assemblies according to claim 1 wherein the edges of said second layers of pressure sensitive adhesive adjacent the second edges of said sheets are spaced toward said first edges of said sheets from the edges of said first layers of pressure sensitive adhesive adjacent the second edges of said sheets so that movement of the second edge of said first sheet of the uppermost sheet assembly in the stack away from the second edge of said second sheet of the uppermost sheet assembly in the stack will initiate peeling of said second layer of pressure sensitive adhesive away from the adjacent sheet assembly in the stack.

3. A stack of sheet assemblies according to claim 2 wherein said release means includes coatings of silicone low adhesion backsize along the front surfaces of said first sheets in said first adhesion zone, and the second layers of pressure sensitive adhesive on the rear surfaces of said second sheets are uniform, of the same adhesive composition, and have an adhesion to glass of less than 10 ounces per inch.

4. A stack of sheet assemblies according to claim 1 wherein said second layers of pressure sensitive adhesive adhering the rear surfaces of the second sheets of the sheet assemblies to the front surfaces of the first sheets on the sheet assemblies beneath them in the stack include second portions positioned between said first adhesion zones and the second edges of said second sheets, and said release means provides second adhesion zones between the front surfaces of the first sheets and the rear surfaces of the second sheets in the stack adjacent said second portions with said second adhesion zones having a release force higher than said low release force in the first adhesion zones that is sufficiently high to firmly adhere adjacent sheet assemblies in the stack together while affording continued peeling away of the uppermost sheet assembly in the stack along said second adhesion zone after initiating of such peeling along the first adhesion zone.

5. 4. A stack of sheet assemblies according to claim 1 wherein said first sheets are transversely perforated along the edges of the first layers of adhesive adjacent the second edges of the first sheets.

6. A stack of sheet assemblies according to claim 1 wherein said sheet assemblies each include a third layer of adhesive adhering a portion of the rear surface of said first sheet adjacent the second edge of the first sheet to the front surface of said rear sheet adjacent the second edge of the second sheet with said second edges generally aligned, said third layer of adhesive extendin9 a distance about equal to said first predetermined distance from said second edges toward the first edges of said sheets, and wherein said first sheets are transversely perforated along both adjacent edges of the first and third layers of adhesive.

7. A stack of sheet assemblies according to claim 1 wherein said second coatings of pressure sensitive adhesive on the rear surfaces of said second sheets are uniform coatings of the same pressure sensitive adhesive, and said release means includes coatings of low adhesion backsize on the portions of said front surfaces of said first sheets in said first adhesion zones.

8. A stack of sheet assemblies according to claim 1 wherein said second coatings of pressure sensitive adhesive are discontinuous on the rear surfaces of said first sheets in the first adhesion zones to provide at least a portion of said release means.

9. A stack of sheet assemblies according to claim 1 wherein said second coatings of pressure sensitive adhesive have different compositions in said first and second portions to provide at least portions of said release means.

10. A stack of sheet assemblies according to claim 1 wherein said first and second sheets have the same peripheral size and shape, have their peripheries aligned in the stack, and have indicia printed on said front surfaces.

11. A stack of sheet assemblies according to claim 1 wherein said coatings of pressure sensitive adhesive comprise acrylic acid in one of said adhesion zones and comprise rubber resin in the other of said adhesion zones.

12. In combination,
a stack of sheet assemblies, each sheet assembly comprising first and second sheets each having front and rear major surfaces and first and second opposite edges,
a first layer of adhesive adhering a portion of the rear surface of said first sheet adjacent the first edge of the first sheet to the front surface of said second sheet adjacent the first edge of the second sheet with said first edges generally aligned, said first layer of adhesive extending a first predetermined distance from said first edges toward the second edges of said sheets, and
a second layer of pressure sensitive adhesive on said rear surface of said second sheet, said second layer of pressure sensitive adhesive comprising a first portion within said first distance from said first edge, and a second portion positioned between said first adhesion zone and the second edge of said second sheet, said portions adhering the rear surface of the second sheet of the sheet assembly to the front surface of the first sheet on the sheet assembly beneath it in the stack,
said sheet assemblies including release means for providing a first adhesion zone between the front surfaces of the first sheets and the rear surfaces of the second sheets of the sheet in the stack, said first adhesion zone extending about said first predetermined distance from the first edges toward the second edges of said sheets and providing a release force between said first portion of said second layer of adhesive and the front surface of the adjacent first sheet in the stack which is lower than the release force of the first layer of adhesive to said first and second sheets to afford easy initiation of peeling of the uppermost sheet assembly from the adjacent sheet assembly in the stack along the first adhesion zone by pulling on the first sheet of the uppermost sheet assembly on the stack, and a second adhesion zone between the front surfaces of the first sheets and the rear surfaces of the second sheets in the stack adjacent said second portion with said second adhesion zone having a release force higher than said low release force in the first adhesion zone that is sufficiently high to firmly adhere adjacent sheet assemblies in the stack together while affording continued peeling away of the uppermost sheet assembly in the stack along said second adhesion zone after initiating of such peeling along the first adhesion zone; and a container comprising walls around said stack of sheet assemblies, including a bottom wall supporting said stack of sheet assemblies, side walls along and closely spaced from the edges of the sheets in said stack of sheet assemblies including a first end wall along the first edges of the sheets in the stack of sheet assemblies, and a top wall along the top of said stack of sheet assemblies, said top wall having an edge surface spaced from said first end wall to provide an opening therebetween, and said edge surface of said top wall being spaced from said end wall by a distance greater than said first predetermined distance so that with an end portion of the first sheet adjacent the second edge of the first sheet of the uppermost sheet assembly in the stack projecting through said opening, tension applied manually to said end portion will first cause separation of the second sheet of the uppermost sheet assembly in the stack from the second sheet assembly in the stack along the first adhesion zone by bending that second sheet around said edge surface, where after said second sheet of the uppermost sheet assembly in the stack will be pulled along the top wall of the container and around said edge surface while carrying with it the first sheet of the second sheet assembly in the stack until the end portion of the second sheet of the uppermost sheet assembly in the stack carries the first sheet of the second sheet assembly in the stack through the opening and is subsequently peeled therefrom, leaving the first sheet of what was originally the second sheet assembly in the stack projecting through the opening in a position to also be manually pulled therethrough in the manner described above.

* * * * *